(12) United States Patent
Miller (10) Patent No.: US 10,896,625 B2
(45) Date of Patent: Jan. 19, 2021

(54) USER FEEDBACK SYSTEM AND METHOD

(71) Applicant: Jillian Miller, Southington, CT (US)

(72) Inventor: Jillian Miller, Southington, CT (US)

(*) Notice: Subject to any disclaimer, the term of this patent is extended or adjusted under 35 U.S.C. 154(b) by 331 days.

(21) Appl. No.: 15/961,096

(22) Filed: Apr. 24, 2018

(65) Prior Publication Data
US 2018/0315339 A1     Nov. 1, 2018

Related U.S. Application Data

(66) Substitute for application No. 62/491,477, filed on Apr. 28, 2017.

(51) Int. Cl.
| | | |
|---|---|---|
| *A63B 69/00* | (2006.01) | |
| *G09B 19/00* | (2006.01) | |
| *A63B 71/06* | (2006.01) | |
| *A63B 4/00* | (2006.01) | |

(52) U.S. Cl.
CPC .......... *G09B 19/0038* (2013.01); *A63B 4/00* (2013.01); *A63B 69/00* (2013.01); *A63B 71/06* (2013.01); *A63B 2071/0655* (2013.01)

(58) Field of Classification Search
CPC .. G09B 19/00; G09B 19/003; G09B 19/0038; A63B 69/00
USPC ........ 434/247, 250, 253, 255, 258; 273/449; 473/440; 482/14, 23, 34, 148
See application file for complete search history.

(56) References Cited

U.S. PATENT DOCUMENTS

| | | | | |
|---|---|---|---|---|
| 2,871,914 A | * | 2/1959 | Timoney .............. | A47D 13/046 482/52 |
| 4,176,471 A | * | 12/1979 | Roe ......................... | A61H 3/00 434/255 |
| 4,988,092 A | * | 1/1991 | Trout ................. | A63B 23/0464 434/255 |
| 5,389,054 A | * | 2/1995 | Dorman .................... | A63B 4/00 482/34 |
| 5,407,406 A | * | 4/1995 | Canela ............ | A63B 21/00178 434/255 |
| 6,135,924 A | * | 10/2000 | Gibbs ..................... | A63B 22/02 482/51 |
| 6,168,548 B1 | * | 1/2001 | Fleming ................... | A63B 3/00 482/23 |
| 6,217,484 B1 | * | 4/2001 | Harshman ........ | A63B 21/00181 434/255 |
| 6,628,265 B2 | * | 9/2003 | Hwang .................... | G10H 1/00 250/221 |
| 6,749,541 B1 | * | 6/2004 | Martin ..................... | A61H 3/00 482/51 |

(Continued)

*Primary Examiner* — Kurt Fernstrom
(74) *Attorney, Agent, or Firm* — MKG, LLC (57) ABSTRACT

A system for providing feedback to a user performing a physical activity includes a first support assembly having a first upright assembly configured to be positioned at a first end of a performance region in which a user performs the physical activity, and a second support assembly having a second upright assembly configured to be positioned at a second end of the performance region, the second end being opposite the first end. The system also includes a first indicator extending between the first upright assembly and the second upright assembly, the indicator establishing a boundary that extends from the first upright assembly to the second upright assembly and configured to provide an immediate feedback signal to the user based on the user intersecting the indicator.

20 Claims, 10 Drawing Sheets

(56) References Cited

U.S. PATENT DOCUMENTS

| | | | |
|---|---|---|---|
| 6,929,586 B2 * | 8/2005 | Johnson | A63B 23/0464 |
| | | | 482/23 |
| 6,942,487 B2 * | 9/2005 | Corbalis | A63B 69/0093 |
| | | | 280/818 |
| 7,131,936 B2 * | 11/2006 | Schlosser | A61H 3/008 |
| | | | 482/69 |
| 7,369,038 B1 * | 5/2008 | Thompson | A63B 71/0605 |
| | | | 340/323 R |
| 7,713,175 B2 * | 5/2010 | Monaghan | A47D 13/04 |
| | | | 482/35 |
| 7,951,045 B1 * | 5/2011 | Brader | A63B 24/0062 |
| | | | 482/3 |
| 8,083,646 B2 * | 12/2011 | Chapa, Jr. | G07C 1/22 |
| | | | 482/8 |
| 8,978,820 B2 * | 3/2015 | Marini | A62B 35/0056 |
| | | | 182/36 |
| 10,561,894 B2 * | 2/2020 | Dalebout | A63B 71/0036 |
| 2006/0270523 A1 * | 11/2006 | Lettelleir | A63B 4/00 |
| | | | 482/23 |
| 2010/0197465 A1 * | 8/2010 | Stevenson | A61H 3/00 |
| | | | 482/51 |
| 2015/0051057 A1 * | 2/2015 | Carter | A63B 21/00054 |
| | | | 482/142 |
| 2015/0141201 A1 * | 5/2015 | Orgal | A63B 23/0458 |
| | | | 482/8 |

* cited by examiner

USER FEEDBACK SYSTEM AND METHOD

CROSS REFERENCE TO RELATED APPLICATION

This application claims the benefit of U.S. provisional application No. 62/491,477, filed Apr. 28, 2017, the contents of which is incorporated herein by reference in its entirety.

TECHNICAL FIELD

The present invention is directed to systems and methods for providing feedback to a user regarding one or more body positions of the user while the user performs a physical activity.

BACKGROUND

In many athletic and other physical activities, maintaining a certain position of the body (e.g., head, arms, legs and torso), direction and/or path of movement is important for a user to complete a physical activity in a manner that achieves a satisfactory rating or score by one or more evaluators or judges of the activity. For example, gymnasts compete by performing one or more physical activities, having their performance of the activities evaluated or scored to a perceived optimal level of performance, and then are ranked individually and/or as teams, based on their score with other gymnasts to determine which gymnast was, or team of gymnasts were, the best at reaching the optimal level of performance.

Generally speaking, gymnasts train numerous practice hours to acquire and/or to maintain a skill set including, for example, strength, coordination, proper technique and form, for not only completing gymnastic routines but to do so in a manner that an evaluator or judge would find their performance close to an optimal level of performance during competition with others. Typically, a substantial portion of this practice time is spent with an experienced coach or trainer that provides feedback to the gymnasts for example, as to their technique and form, to assist him/her in acquiring and maintaining the aforementioned skill set for performance and to minimize, if not eliminate, incorrect technique and form. Often, such feedback is provided by the trainer positioned near the gymnast or by physical barriers (e.g., mats) to establish an area or region in which the gymnast should stay during a performance of a routine. In some cases, such feedback is obstructive and/or fails to provide a training environment that optimally recreates competition conditions. As such, the user does not undergo the same experience when competing and fails to perform satisfactorily.

SUMMARY

An embodiment of a system for providing feedback to a user performing a physical activity includes a first support assembly having a first upright assembly configured to be positioned at a first end of a performance region in which a user performs the physical activity, and a second support assembly having a second upright assembly configured to be positioned at a second end of the performance region, the second end being opposite the first end. The system also includes a first indicator extending between the first upright assembly and the second upright assembly, the indicator establishing a boundary of the performance region that extends from the first upright assembly to the second upright assembly and configured to provide an immediate feedback signal to the user based on the user intersecting the indicator.

An embodiment of a method of providing feedback to a user performing a physical activity includes positioning a first support assembly having a first upright assembly at a first end of a performance region in which a user performs the physical activity, positioning a second support assembly having a second upright assembly at a second end of the performance region, the second end being opposite the first end, and extending a first indicator between the first upright assembly and the second upright assembly to establish a boundary of the performance region that extends from the first upright assembly to the second upright assembly. The method further includes, based on the user intersecting the first indicator, providing an immediate feedback signal to the user.

DETAILED DESCRIPTION

The present invention is directed to apparatuses, systems and methods for providing immediate, real time feedback to an athlete or other user to aid the user in achieving and/or maintaining proper body posture, position, path and/or form, while performing an athletic activity or other physical activity. The apparatuses, systems and methods may also be configured to establish boundaries of an area of activity and/or establish a path along which a user should remain while performing an activity. The user may be a gymnast performing gymnastic routines (e.g., on floor mats or a balance beam), another type of athlete or any other user performing an activity for which a specific form, body position and/or path of movement is desired.

An embodiment of a positioning and/or feedback system includes two or more support assemblies positioned on opposing ends of a performance region (also referred to as an area of activity), i.e., a region R in which a user is to perform an activity, such as a gymnastics routine or other athletic activity. Examples of the region R are shown in FIGS. 1A, 1B, 2, 3, 5A and 6. A body position indicator establishes a boundary of the region R and/or path of movement that extends between the support assemblies, and provides immediate feedback when part of the user's body contacts or otherwise intersects the boundary established by the indicator. For example, the indicator provides an immediate notification to a user when any part of the user's body intersects the boundary of the region R established by the indicator, which notifies the user that the user has reached or exceeded the limit of the region R established by the indicator. It is noted that reference to a "user's body" may include actual body parts, clothing worn by the user and/or accessories or equipment held by the user while performing an activity.

The feedback or notification may be contact with the body, a haptic signal, a visual notification, an audible notification and/or any other signal that provides immediate notice to the user that the user has intersected the boundary of the region R established by the indicator. In one embodiment, the indicator includes one or more indicating members that provide haptic feedback to the user, indicating a body position of the user while performing an activity. For example, the indicating member is a pole, string, ribbon, streamer or other elongated member that extends between the support assemblies and establishes the boundary of the region R.

Figure 1A:
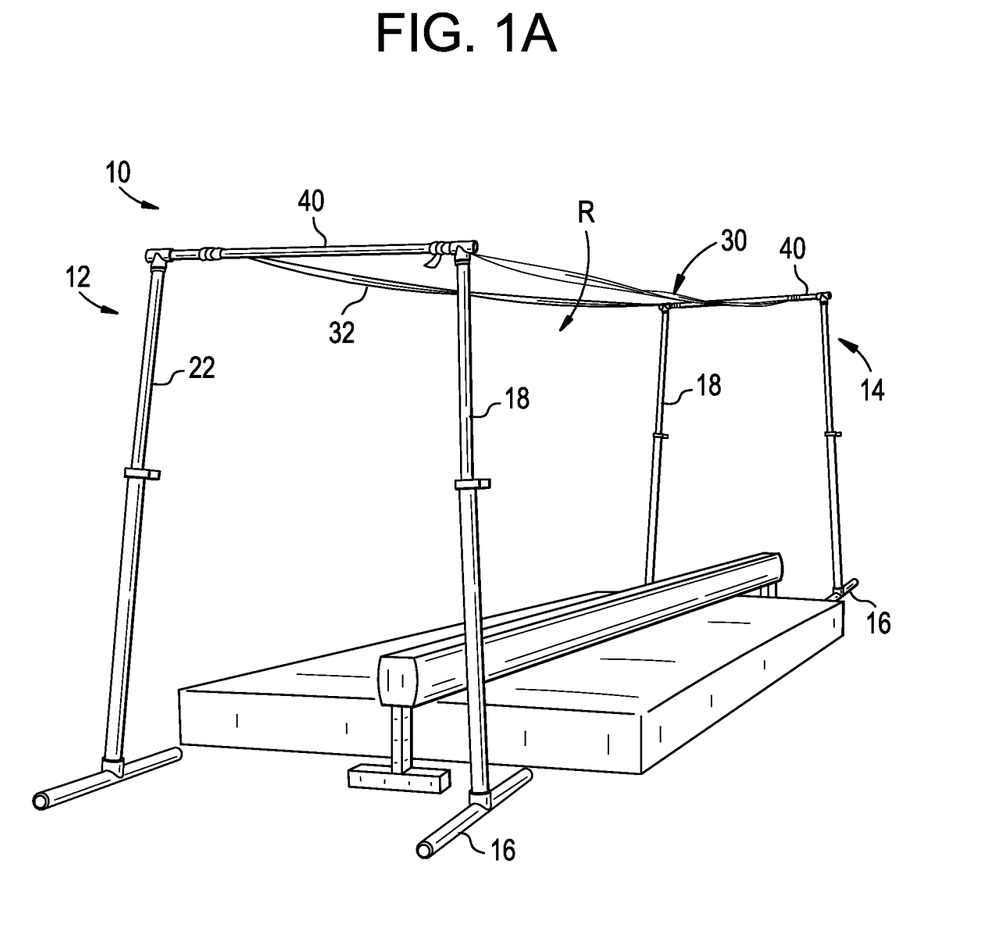
FIG. 1A is a perspective view of a system for providing immediate feedback to a user in accordance with one embodiment the present invention.
Figure 1B:
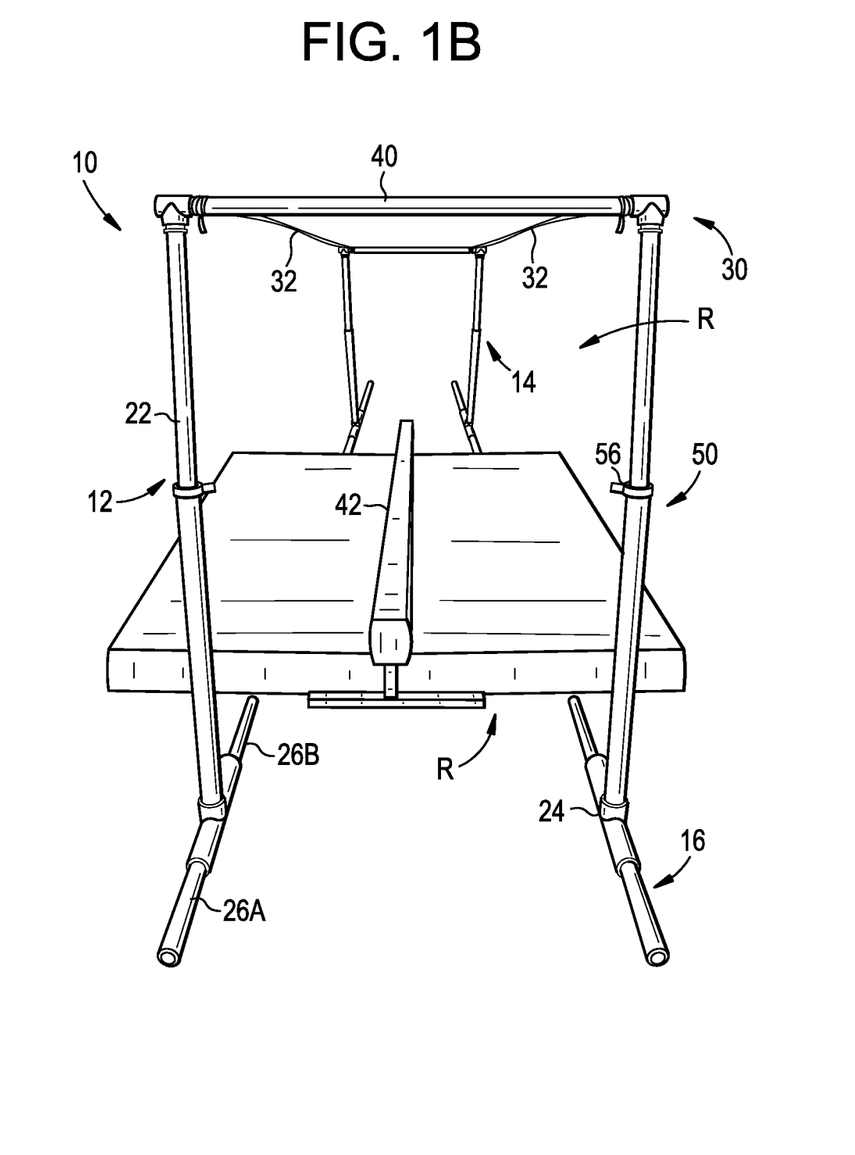
FIG. 1B is an end, elevation view of the system of FIG. 1A.

One embodiment of a feedback system 10 is shown in FIGS. 1A and 1B. The system 10 has a pair of support assemblies including a first support assembly 12 and a second support assembly 14. Each support assembly 12 and 14 includes a base 16 and an upright assembly 18 attached thereto.

In one embodiment, each upright assembly 18 includes one or more vertical members 22, which may be completely vertical or at an angle relative to the base 16. A bottom end of the one or more vertical members 22 may be releasably connected to the base 16.

Figure 2:
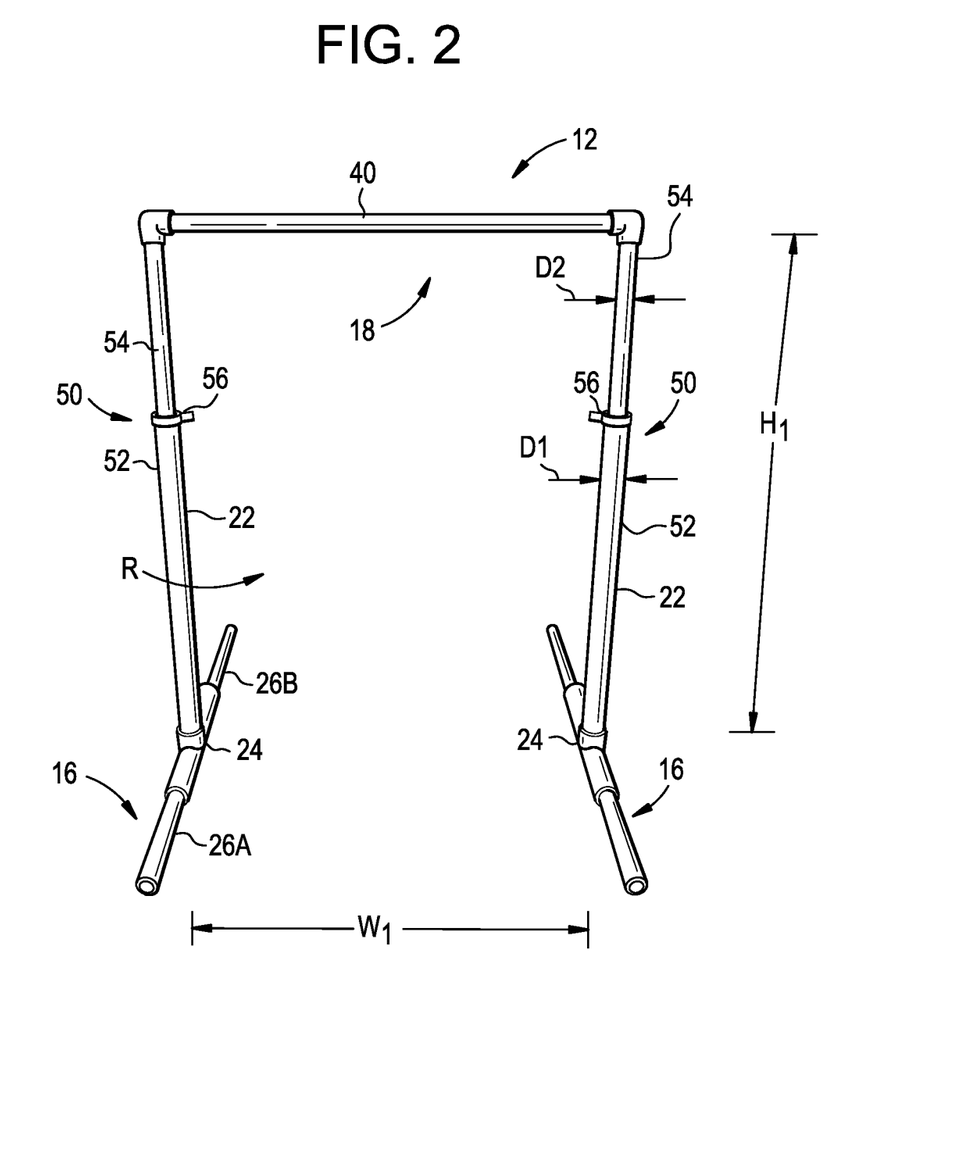
FIG. 2 depicts an embodiment of a support assembly of the system of FIGS. 1A and 1B.
Figure 3:
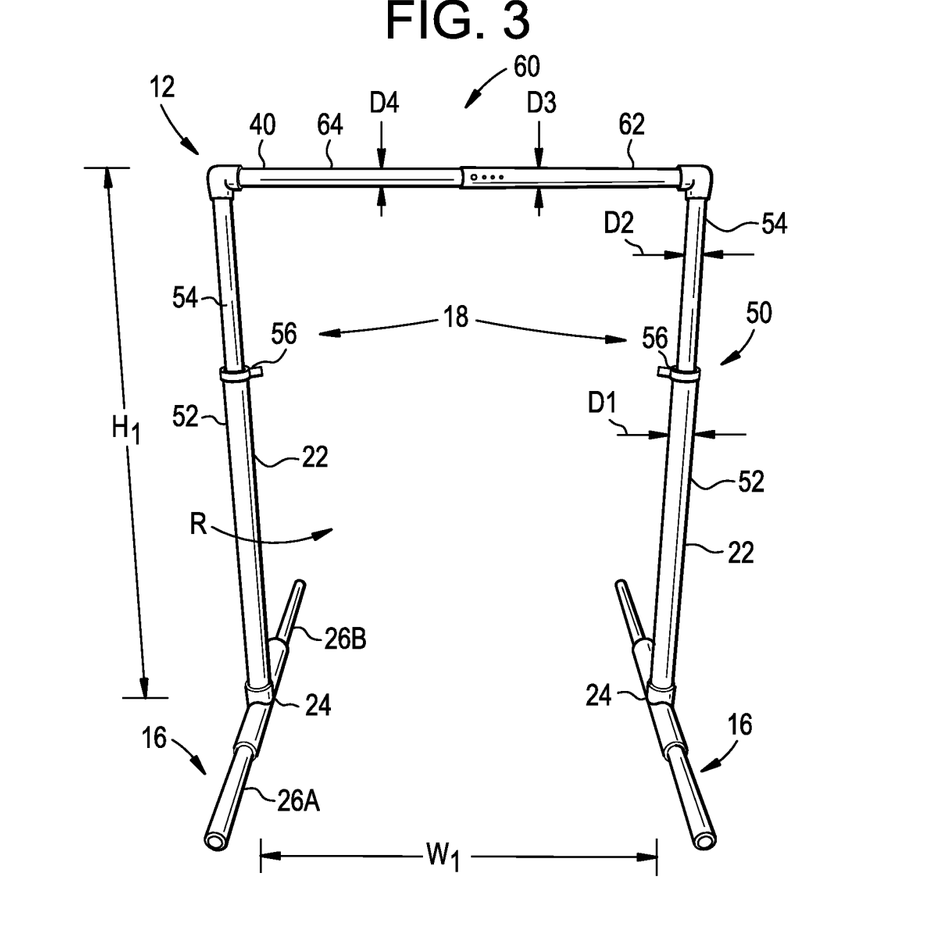
FIG. 3 depicts another embodiment of a support assembly of the system of FIGS. 1A and 1B.

For example, as shown in FIGS. 1A and 1B and in FIGS. 2 and 3, the base 16 has one or more "T" couplings 24 positioned thereon that receive and engage the bottom end of the vertical member 22 and/or the upright assembly 18. The base 16 may include one or more base members, such as horizontal base members 26A and 26B, releasably connected to opposing sides of the "T" coupling 24.

The feedback system 10 also includes an indicator, which in this embodiment includes one or more indicating mechanisms 30 configured, in one embodiment, to extend between the first support assembly 12 and the second support assembly 14. In one embodiment, the indicating mechanism 30 includes one or more elongated indicating members 32, which are tangible and tactile components that can be detected by a user via the user's sense of touch. The indicating members 32 provide haptic feedback to the user immediately upon intersecting and coming contact with an indicating member 32, allowing the user to immediately recognize that part of the user's body has an incorrect form, is deviating from a desired path, or is positioned at or outside the boundary of the performance region established by each member 32.

For example, as shown in FIGS. 1A and 1B, the indicating members 32 are streamers or ribbons or other tactile material(s) that are attached at one end to the first support assembly 12 and attached at the other end to the second support assembly 14. Any suitable material or component may be used as an indicating member 32, such as a string or a ribbon, or a relatively rigid member, such as a pipe or a pole.

Each indicating member 32 may be releasably or removably attached to the support assemblies 12 and 14 in any suitable manner. For example, each ribbon shown in FIGS. 1A and 1B is attached to the support assemblies 12 and 14 by a relatively weak adhesive such as adhesive tape, or by a clip that releases the ribbon when sufficiently force is applied to the ribbon by a body part of the user (e.g., if the user's arm or leg falls into or otherwise contacts the ribbon). Alternatively, the indicating member 32 may be attached and breakable when sufficient force acts on them. For example, the indicating member 32 can be a thin strip of material (e.g., a paper streamer) that breaks easily when the user applies a force to the indicating member 32. In another example, the indicating member 32 includes sections that are releasably connected together, e.g., a first section extending from the support assembly 12 and a second section extending to the first section from the support assembly 14.

If the indicating member 32 or members 32 is/are rigid, each indicating member 32 can be rested on a suitable receiving element on each support assembly 12 and 14 without adhering or otherwise fixing the indicating member 32 thereon, so that the indicating member 32 may easily be pushed or pulled off of the support assemblies 12 and 14 when a user contacts the indicating member, e.g., falls into or otherwise moves the indicating member 32.

In one embodiment, the indicating members 32 are made of a material and are connected to the upright assemblies 12 and 14 so that a gymnast or other user does not suffer any injury or experience significant pain when contacting the indicating member 32. The user can thus perform activities without being concerned about being hurt or impeded when falling into or through one or more of the indicating members 32.

The indicating members 32 may be releasably attached or otherwise connected at or near a top end of the support assemblies 12 and 14 as shown in FIGS. 1A and 1B, but are not so limited. The indicating members 32 may be connected at any desired vertical locations along a height of the support assemblies 12 and 14, such as a middle or lower part of each of the support assemblies 12 and 14. In addition, although two indicating members 32 are shown at opposing sides of and as connected to the support assemblies 12 and 14, any number of indicating members 32 or other indicating mechanisms may define boundaries of the performance region. For example, in addition to the indicating members 32 attached to a top end of the support assemblies of FIGS. 1A and 1B, additional members 32 may be connected at lower locations to provide additional haptic or other immediate feedback, and/or to define a two- or three-dimensional boundary.

In one embodiment, the first and second support assemblies 12 and 14 each include a cross member 40 or other component to connect the vertical members 22, to further support and maintain the upright assemblies 12 and 14 in a desired position, such as for example spaced apart to a desired width. For example, the upright assemblies 12 and 14 in FIGS. 1A and 1B are connected by a cross member 40 having a length so that the indicating members 32 are at a desired distance on either side of a balance beam 42. In another example, the support assemblies 12 and 14 can be positioned at locations on a floor mat and define a region in which a gymnast should stay and a path along which the user should remain (e.g., from one corner to an opposite corner) while performing or practicing a floor routine between the members 32.

The cross member 40 may be releasably connected to the vertical members 22, and in addition to maintaining a width of a desired region (referred to herein as an area of activity), can provide immediate haptic feedback to the user.

In one embodiment, the support assemblies 12 and 14 are selectively height and/or width adjustable about a height $H_1$ and a width $W_1$, respectively, of the region R. The support assemblies are also length adjustable about a length $L_1$ of the region R. Each vertical member 22 may include a height adjustment mechanism 50. For example, as shown in FIG. 2, each vertical member 22 includes a lower or receiving portion 52, an upper or telescoping portion 54, and a height adjustment mechanism 50 affixed therebetween to fix a position of the telescoping portion 54 relative to the receiving portion 52. The height adjustment mechanism allows a user to change the height of the support assembly 12 and/or the second support assembly 14

The receiving portion 52, for example, defines a diameter D1 and an internal diameter (not shown), and the telescoping portion 54 defines a diameter D2, where D1 and the inside diameter are greater than D2 such that the telescoping portion 54 is received within the receiving portion 52, or such that the telescoping portion 54 extends upwardly from within the receiving portion 52. The height adjustment mechanism 50 may take any suitable form, such as a clamp or clip that engages the telescoping portion 54, or a series of holes in the receiving portion 52 and/or the telescoping port 54 that engage a pin. For example, the height adjustment mechanism 50 includes a clamp 56 releasably secured to the telescoping portion 54 such that it cannot retract further within the receiving portion 52 and the desired height of the upright assemblies 12 and 14 is maintained.

Figure 4:
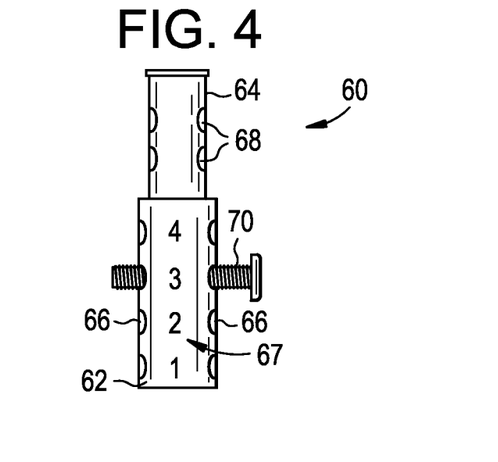
FIG. 4 depicts an embodiment of a width and/or height adjustment mechanism for changing a width and/or height of the support assembly of FIG. 3.

Referring to FIGS. 3 and 4, in one embodiment, the cross member 40 is selectively width adjustable and includes a width adjustment mechanism 60 coupled to a receiving portion 62 and a telescoping portion 64 of the cross member 40. The width adjustment mechanism 60 in this embodiment is operable to fix a position of the telescoping portion 64 relative to the receiving portion 62. The receiving portion 62 defines a diameter D3 and an inside diameter (not shown), and the telescoping portion 64 defines a diameter D4, where D3 and the inside diameter are greater than D4 such that the telescoping portion 64 is received within the receiving portion 62; or such that the telescoping portion 64 extends outwardly from within the receiving portion 62.

In one embodiment and as shown in FIGS. 3 and 4, the width adjustment mechanism 60 includes a series of apertures 66 formed in the receiving portion 62 and a series of apertures 68 formed in the telescoping portion 64 whereby the relative position therebetween is set and fixed by passing a fastener 70 through a pair of corresponding apertures 66 and 68. In one embodiment, the fastener 70 is an insert pin, a spring pin or other component, and the relative position between the receiving portion 62 and the telescoping portion 64 is set and fixed via engaging the spring pin through a pair of corresponding apertures 66 and 68.

In one embodiment, one or more components of the upright assembly 18, the cross member 40 and/or the vertical members 22 include indicia 67 that indicates the height and/or width of the support assemblies 12 and 14. For example, indicia 67 (e.g., marks, numbers, symbols or other indicia 67 as shown in FIG. 4) may be included on the surface of one or more of the receiving portions 52 and 62 or the telescoping portions 54 and 64 that define, for example, a height position of each telescoping portion 54, e.g., a position of each telescoping portion 54 relative to a respective receiving portion 52. In another example, the cross member telescoping portion 64 includes indicia 67 that define a width position of each cross member telescoping portion 64, e.g., a position of the cross member telescoping portion 64 relative to the cross member receiving portion 62. The indicia 67 allow a user to ensure that the height $H_1$ of the vertical members 22 of an upright assembly 18 are at least substantially the same, and/or to ensure that the height $H_1$ and/or width $W_1$ of support assemblies 12 and 14 are at least substantially the same. In one embodiment, where it may be necessary or desirable, the indicia 67 allow for setting different heights and/or widths.

The upright assemblies 12 and 14 may be made from any suitable material. For example, the base 16, the vertical members 22 and the cross member 40 are fabricated from plastic hollow members, such as PVC pipes. In the example of FIGS. 1A-1B and FIGS. 2-4, the receiving portion 52 is fabricated from one-inch PVC pipe and the telescoping portion 54 is fabricated from one-half-inch PVC pipe. The cross member receiving portion 62 is fabricated from one and one-half inch PVC pipe and the cross member telescoping portion 64 is fabricated from one-inch PVC pipe. The receiving portion 52, the telescoping portion 54, the cross member receiving portion 62 and the cross member telescoping portion 64 are each about three feet long in this example, although any desired length (which may be the same or different for various portions) may be chosen, e.g., depending on the size of the user and the type of activity being performed.

Figure 5A:
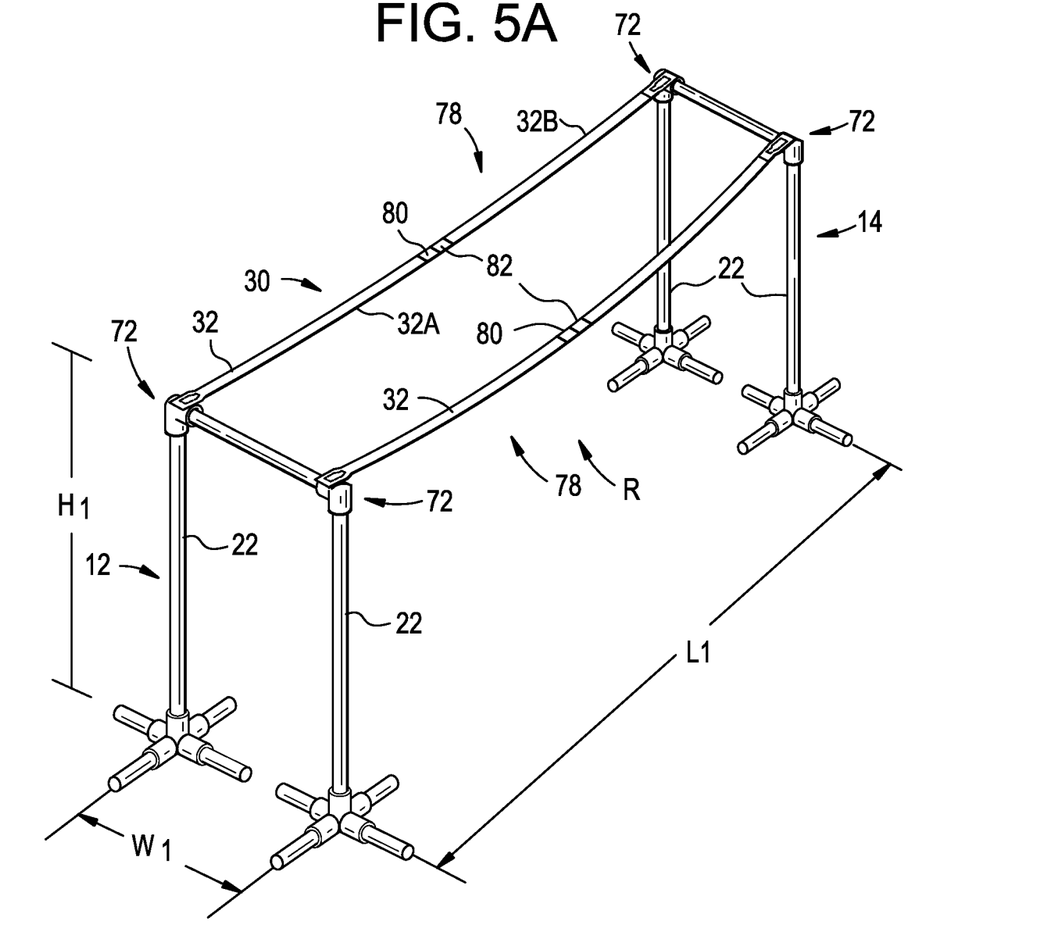
FIG. 5A is a perspective view of a system for providing immediate feedback to a user in accordance with one embodiment the present invention, which includes indicating members releasably connected to opposing support assemblies.
Figure 5B:
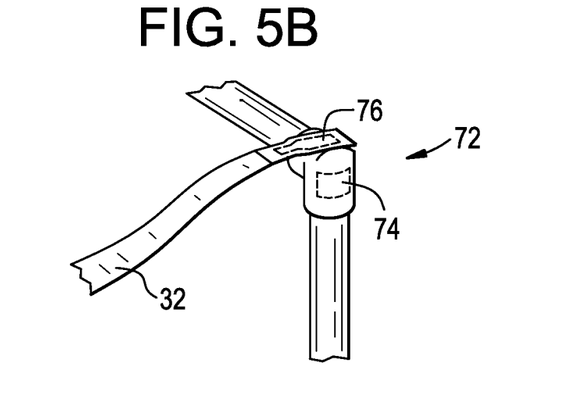
FIG. 5B is a close-up view of a coupling system of the system of FIG. 5A.

FIGS. 5A and 5B show another embodiment of the feedback system 10, which includes magnetic couplers located at one or more connection points between the indicating member 32 and a support assembly, and/or configured to releasably connect sections of the indicating member 32.

In the embodiment of FIGS. 5A and 5B, the indicating members 32 are releasably connected at each end to a respective support assembly 12 or 14 by a magnetic coupling mechanism 72. One or more magnets 74 are adhered to a surface or fixed within an interior of a component of the support assembly 12 and/or 14, and each magnet 74 is configured to attract and hold in place a corresponding component 76 (e.g., a magnet or a magnetic ferrous metal) that is affixed to an end of each indicating member 32. The corresponding component 76 can be attached to the indicating member 32 in any suitable manner, such as by adhering the component 76 to the indicating member 32 and/or sewing the component 76 into the indicating member 32. The magnets 74 and components 76 are selected so that the strength of the magnetic force is strong enough to maintain the indicating member 32 in an operational location to define the boundary, but weak enough to allow a component 76 to separate from a respective magnet 74 when a gymnast or other user applies a sufficient force to the indicating member 32 so as not to cause injury to the user.

In addition to or in place of the magnetic coupling mechanism 72, the indicating member 32 may include multiple sections releasably connected by magnetic coupling. For example, the indicating members shown in FIG. 5A each include sections 32A and 32B, which are connected by a magnetic coupler 78. The magnetic coupler 78 includes a magnet 80 attached to one of sections 32A and 32B, and a corresponding component 82 (e.g., another magnetic or a ferrous metal) attached to another one of sections 32A and 32B.

As indicated above, the materials and configurations used to construct the feedback system 10 and components thereof are not limited to the embodiments described herein. Components of the support assemblies 12 and 14, such as the base 16, the upright assemblies, the vertical members 22 and may be made of plastic, metal or any other suitable material. In addition, various components may have any desired color or appearance. For example, different components may have colors and/or designs corresponding to the colors of a school, gym, athletic organization or other entity (e.g., pipe segments making up the support assemblies have multiple colors corresponding to the colors representing a school or gymnastics team).

Although the indicator and the feedback system 10 are described above as including a tangible and tactile component extending between the support assemblies 12 and 14, they are not so limited. Further, the support assemblies 12 and 14 and the feedback system 10 are not limited to the materials and configurations discussed above.

Figure 6:
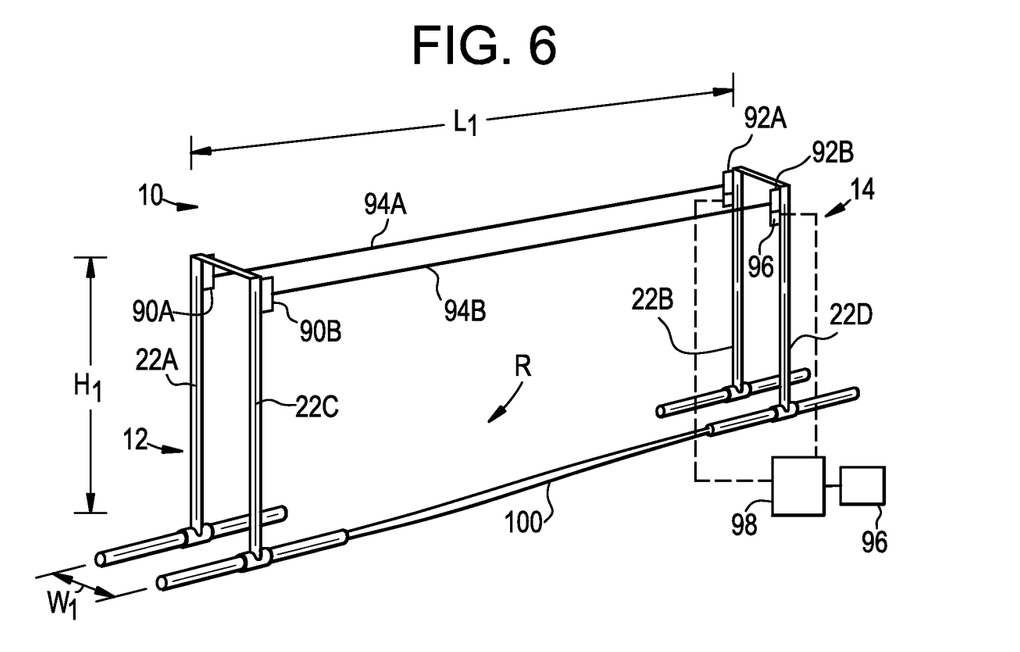
FIG. 6 is a perspective view of a system for providing immediate feedback to a user in accordance with one embodiment the present invention, which includes indicators that each include a laser beam extending between opposing support assemblies.

In one embodiment, the indicating mechanism 30 is configured as a laser beam coupled to a feedback device. FIG. 6 illustrates an example of the feedback system 10, in which the indicating mechanism 30 includes a light source 90A positioned on a vertical member 22A of the first support assembly 12, and a detector 92A is positioned on an opposing vertical member 22B of the second support assembly 14. Similarly, a light source 90B is positioned on a vertical member 22C of the first support assembly 12, and a detector 92B is positioned on an opposing vertical member 22D of the second support assembly 14. The light sources 90A and 90B, in one embodiment, are laser sources such as diode laser sources.

One or more of the detectors 92A and 92B may include their own integrated processing device (including, e.g., an input/output device, a processor, and a memory) that determines when a laser beam is broken and communicates with a feedback device, such as a speaker 96. Alternatively, each detector 92A and 92B may be in communication with a separate processing device 98 and/or a feedback device such as the speaker 96 remotely positioned from the detectors 92A and 92B.

In use, the support assemblies 12 and 14 are aligned so that a laser beam 94A is emitted from the light source 90A and impinges on the detector 92A, and the laser beam 94A propagates along a first side of an area of activity such as the region R in which the user should stay, e.g., an area or region around a balance beam, or a path along a floor mat in which a gymnast should remain while performing part of a routine). Likewise, the support assemblies 12 and 14 are aligned so that a laser beam 94B is emitted from the light source 90B and impinges on the detector 92B, and the laser beam 94B propagates along a second opposing side of the area of activity. Optionally, an alignment device or system may be included, such as one or more elongated members 100 configured to be inserted into the respective base of each support assembly 12 and 14.

When the gymnast or other user intersects the laser beam 94A and/or 94B, the corresponding detector 92A and/or 92B detects that the beam is broken and sends a signal to a feedback device such as the speaker 96. The user is thereby immediately alerted that part of the user's body has intersected the boundary of the region R. It is noted the indicating mechanism 30 may include tactile member configurations, laser configurations or a combination thereof.

The feedback device may be any type of device, such as a visual indicator (e.g., a light bulb or diode array), an audible indicator (e.g., a beeper or buzzer) or a haptic indicator (e.g., a vibrating device that causes the floor and/or equipment on which an activity is performed to vibrate). For example, a vibrating device may be attached to a balance beam (e.g., on an exterior side surface or bottom surface, or on an interior surface of the beam) or placed on a mat or the floor for floor routines.

Other types of feedback may be used in conjunction with the haptic feedback provided by the indicating member 32. For example, in addition to haptic feedback, and audible indicator or visual indicator may be included (e.g., operably connected to the magnetic couplers of FIGS. 5A and 5B) that provides a visual and/or audible signal in response to the indicating member 32 being separated from a support assembly or separation of sections of the indicating member 32.

Figure 7:
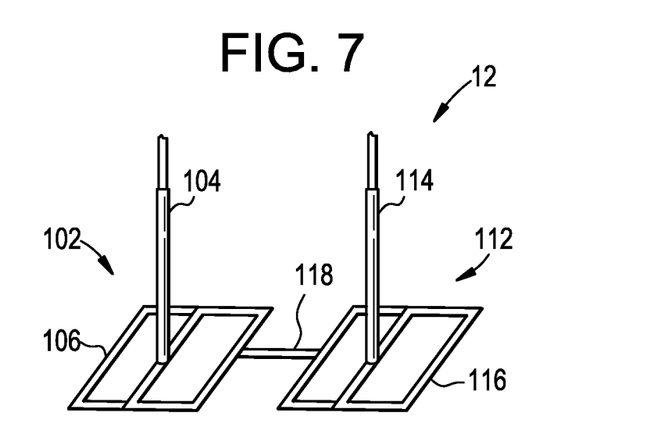
FIG. 7 depicts an embodiment of a support assembly of the system of FIGS. 1A and 1B, FIGS. 5A and 5B, and/or FIG. 6.

The support assemblies 12 and 14 may each be an integrated assembly having multiple vertical members 22 connected together via, e.g., the cross member 40, as discussed above. Alternatively, each support assembly 12 and 14 may include separate structures that can be individually positioned. For example, as shown in FIG. 7, the support assembly 12 includes a first subassembly 102 having a first vertical member 104 and a first base 106, and a second subassembly 112 having a second vertical member 114 and a second base 116. The first and second bases 106 and 116 are configured to support a respective vertical member 104 and 114 so that each subassembly 102 and 112 remains upright without any additional support.

The first and second subassemblies 102 and 112 can thus be individually positioned. In one embodiment, the bases 106 and 116 are configured so that they can be joined together to establish a pre-selected width of the area of activity. For example, the bases 106 and 116 each form a horizontal rectangular structure having dimensions (e.g., from a vertical member to a side of the base) that define a selected distance. The selected distance is selected so that when the bases 106 and 116 are brought together on a surface, the overall distance between the vertical members 104 and 114 is equal to a preselected width (e.g., the width $W_1$) of the area of activity (region R, e.g., an area around a balance beam). In one embodiment, a width maintaining member 118 such as a length of PVC pipe or other plastic member is connected at one end to the base 106 and at another end to the base 116, and maintains the bases 106 and 116 spaced apart and defining a selected width. The width maintaining member 118 may include a width adjustment mechanism. For example, the width maintaining member 118 can include a receiving portion and a telescoping portion coupled together and adjustable via an adjustment mechanism similar to the width adjustment mechanism 60 of FIG. 3.

Figure 8:
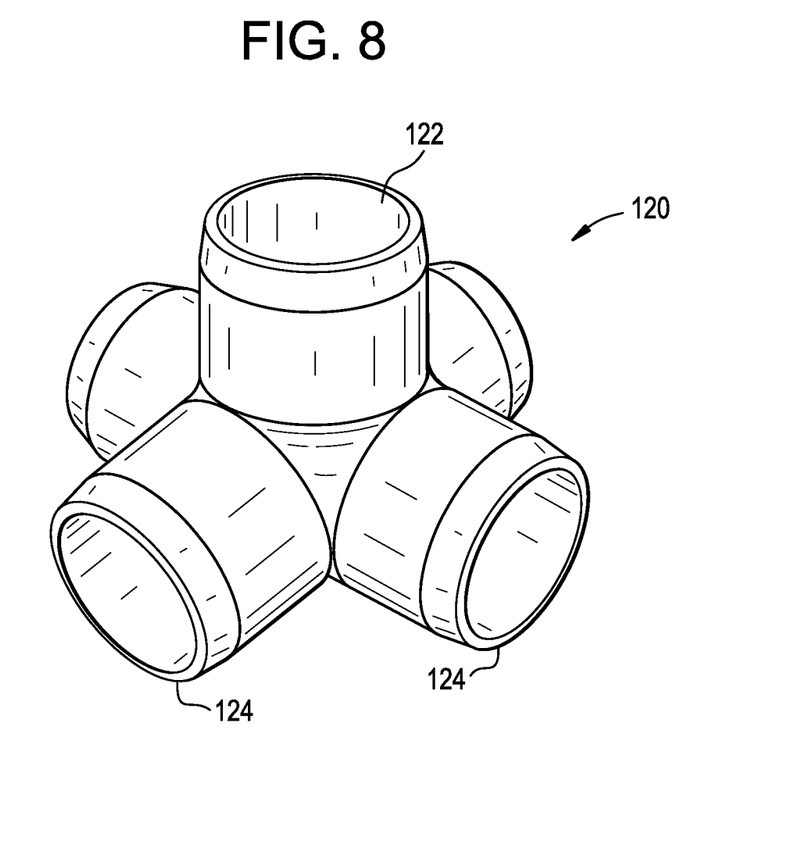
FIG. 8 depicts an embodiment of a base of a support assembly of the system of FIGS. 1A and 1B, FIGS. 5A and 5B, and/or FIG. 6.

FIG. 8 shows an embodiment of a base assembly 120 that can be used to support vertical members or other components of the support structure 12 and/or the support structure 14. In this embodiment, the base assembly 120 is an integrated structure configured to connect a component of an upright assembly, such as the vertical member 22, the vertical member 104 and/or the vertical member 114. As shown, the base assembly 120 includes a connection point 122 for receiving a vertical member or other upright component, and four horizontal connection points 124 that can each receive a horizontal member. An example of the base assembly 120 is a 5-way PVC fitting, although the base assembly 120 may have two, three or any desired number of horizontal connection points.

Figure 9A:
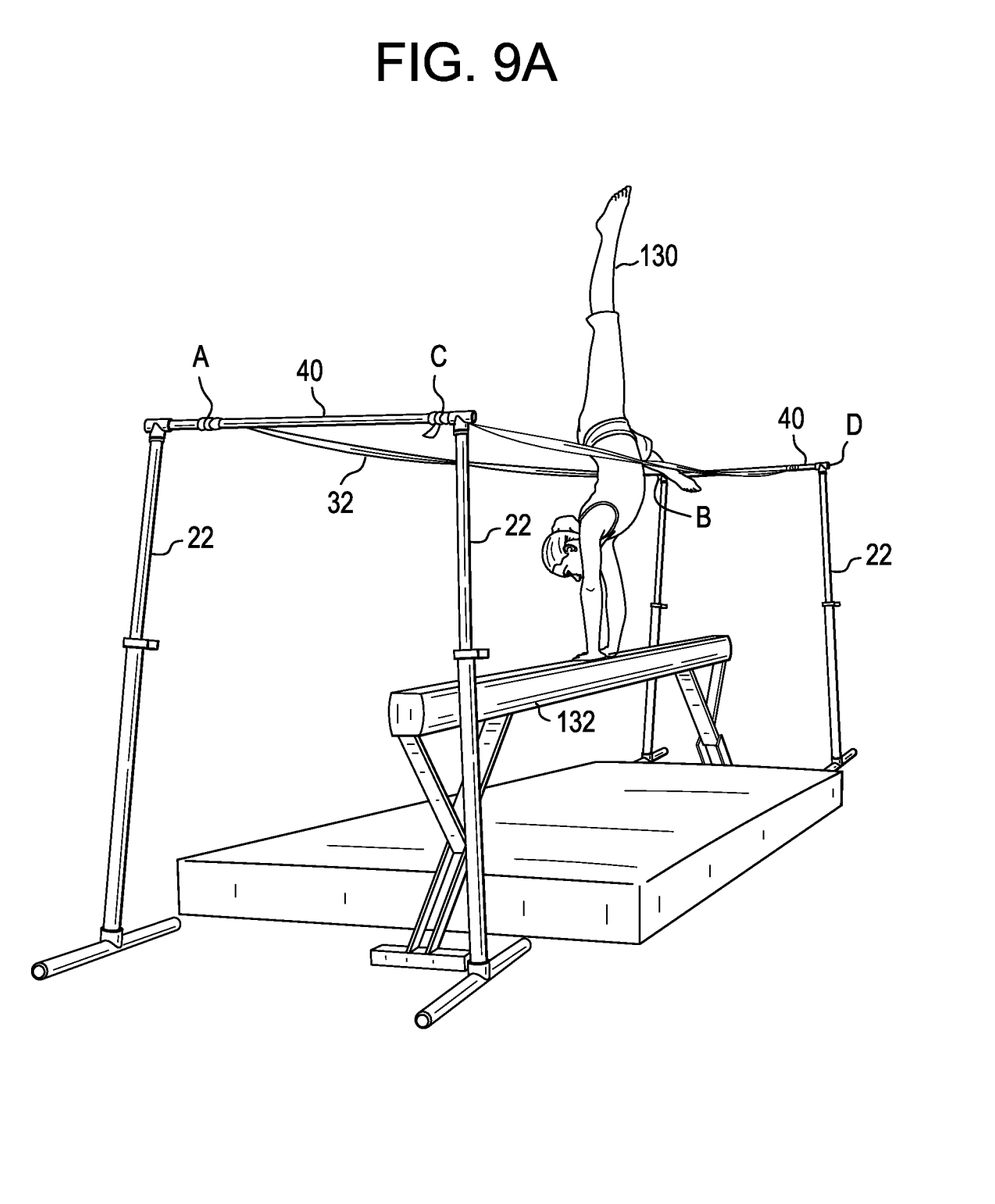
FIGS. 9A-9C depict an example of use of the system of FIG. 1 by a gymnast performing an activity.
Figure 9B:
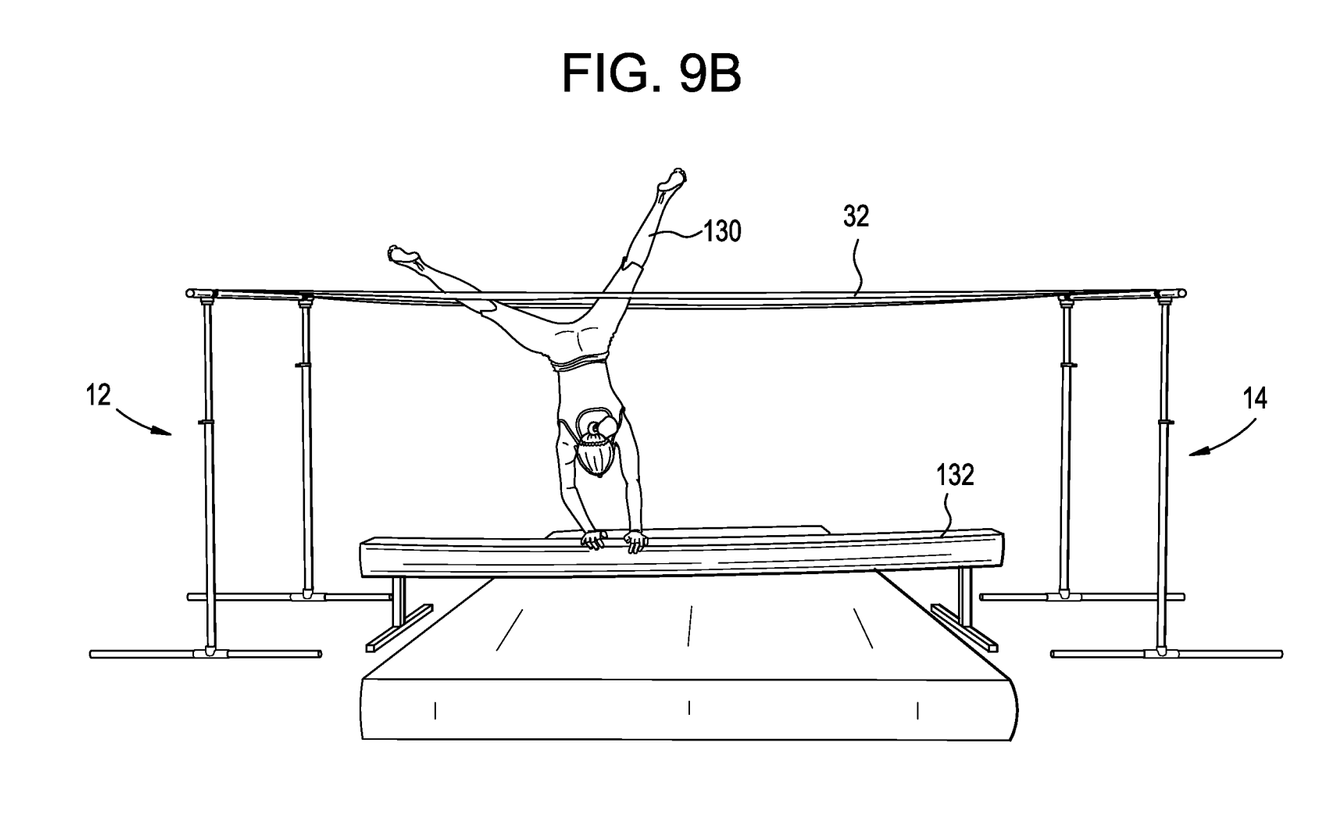
Figure 9C:
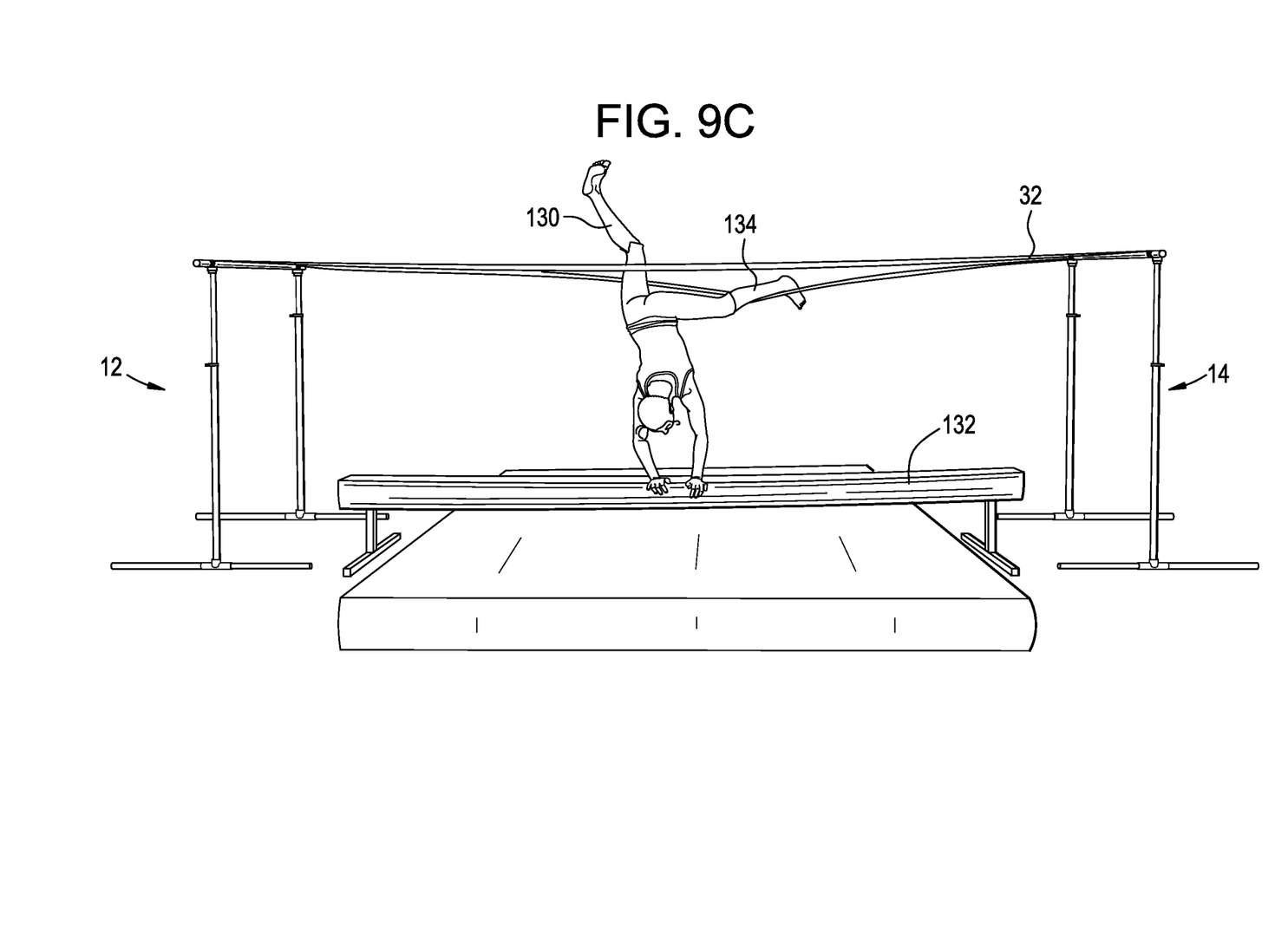

FIGS. 9A-9C illustrate aspects of methods of use of the feedback system 10 in the context of gymnastics, although the methods may be applicable to a variety of athletic and non-athletic physical activities. In the example of FIGS. 9A-9C, the feedback system 10 is configured to provide an immediate haptic feedback signal to a gymnast 130 indicating a body position of the gymnast 130 while performing or practicing a routine. The indicating members 32 in this example are flexible ribbons extending between opposing upright assemblies 18 of respectively opposing support assemblies 12 and 14.

For example, and as shown in FIG. 9A, a first end of a first indicating member 32 is releasably attached to an upright assembly 18 of the first support assembly 12 at a first point A, and a second end of the first indicating member 32 is releasably attached to an upright assembly 18 of the second support assembly 14 at a second point B. Similarly, a first end of a second indicating member 32 is releasably attached to the upright assembly 18 of the first support assembly 12 at a third point C, and a second end of the second indicating member 32 is releasably attached to the upright assembly 18 of the second support assembly 14 at a fourth point D. The length of the feedback system 10, and correspondingly the length of the area of activity and path (e.g., region R) is selectively adjustable by setting a length for the indicating members 32.

In the example of FIGS. 9A-9C, the system 10 is placed such that it straddles a balance beam 132 and defines an area of activity (e.g., the region R), which in this example includes a path along the balance beam 132 and includes an acceptable area of deviation from a vertical position extending upwardly from the balance beam 132. The gymnast 130 performs a routine, or portions thereof, on the balance beam 132. As shown in FIGS. 9B and 9C, if the gymnast's body extends outwardly of the region R, e.g., the gymnast's leg contacts one of the indicating members 32, the gymnast 130 receives immediate haptic feedback by sensing contact with the indicating member 32 that defines the boundary of the region R. The indicating member 32 in this example may be a paper streamer that breaks when the gymnast hits it, or a flexible strap or ribbon that may deform without breaking.

The feedback system 10 of the present invention is selectively adjustable in height, width and length. Height adjustability accommodates different height gymnasts and beams set at varying heights, for example training beams and competition beams. Width adjustability accommodates different sizes of the area of activity. Length adjustability accommodates different activities (e.g., beam and floor routines) performed by the user.

The feedback system 10 of the present invention is light in weight and easily assembles and disassembles. The system 10 provides for a substantially smaller footprint than the use of mats or other devices that may provide some feedback to a gymnast while performing a routine. By providing immediate feedback, the gymnast or other user develops an increased body awareness such that the gymnast can self-correct, e.g., correct the positioning of hips or legs. The system 10 provides an efficient and economical solution for the user trying to master or perfect a routine or other activity during practice at, e.g., a gymnasium or home.

It is noted that, although embodiments are described herein as being applicable to balance beams and mats (e.g., for a floor routine), they are not so limited, and can be used with any gymnastic or other athletic apparatus to provide feedback to an athlete. Examples of such gymnastic or other athletic apparatus include vaulting table setups, pommel horses, still rings, parallel bars, and any other suitable equipment or configuration.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A system for providing feedback to a user performing a physical activity, the system comprising:
    a first support assembly having a first upright assembly configured to be positioned at a first end of a performance region in which a user performs a physical activity;
    a second support assembly having a second upright assembly configured to be positioned at a second end of the performance region, the second end being opposite the first end; and
    a first indicator extending between the first upright assembly and the second upright assembly, the first indicator configured to establish a boundary of the performance region that extends from the first upright assembly to the second upright assembly and configured to provide an immediate feedback signal to the user based on the user intersecting the first indicator such that when the user contacts the first indicator, the first indicator releases from at least one of the first support assembly and the second support assembly.

2. The system of claim 1, wherein the first indicator is releasably connected to the first support assembly and the second support assembly.

3. The system of claim 1, further comprising a second indicator, wherein the first indicator extends between the first support assembly and the second support assembly and is configured to establish a first boundary along a first side of the performance region and the second indicator extends between the first support assembly and the second support assembly and is configured to establish a second boundary along a second side of the performance region opposite the first side.

4. The system of claim 1, wherein the feedback signal is one of a haptic signal, a visual notification and an audible notification.

5. The system of claim 1, wherein the first indicator is a member connected to the first support assembly and the second support assembly, the member providing the immediate feedback signal as one of a haptic signal, a visual notification and an audible notification.

6. A system for providing feedback to a user performing a physical activity, the system comprising:
    a first support assembly having a first upright assembly configured to be positioned at a first end of a performance region in which a user performs a physical activity;
    a second support assembly having a second upright assembly configured to be positioned at a second end of the performance region, the second end being opposite the first end; and
    a first indicator extending between the first upright assembly and the second upright assembly, the first indicator configured to establish a boundary of the performance region that extends from the first upright assembly to the second upright assembly and configured to provide an immediate feedback signal to the user based on the user intersecting the first indicator;

wherein the first indicator includes at least a first section and a second section, the first section releasably connected to the second section, and based on the user contacting the first indicator, the first section is configured to separate from the second section.

7. The system of claim 1, wherein the first upright assembly is comprised of a pair of first upright assemblies configured to establish a first side and a second side at the first end of the performance region; and wherein the second upright assembly is comprised of a pair of second upright assemblies configured to establish the first side and the second side at the second end of the performance region; the system further comprising a first cross member connected to and extending between the pair of the first upright assemblies and a second cross member connected to and extending between the pair of the second upright assemblies, wherein the first cross member and the second cross member at least partially define a width of the performance region from the first side to the second side.

8. The system of claim 7, wherein at least one of the first cross member and the second cross member includes an adjustment mechanism configured to change the width of the performance region.

9. The system of claim 1, wherein the first upright assembly and the second upright assembly each include a height adjustment mechanism.

10. A system for providing feedback to a user performing a physical activity, the system comprising:
a first support assembly having a first upright assembly configured to be positioned at a first end of a performance region in which a user performs a physical activity;
a second support assembly having a second upright assembly configured to be positioned at a second end of the performance region, the second end being opposite the first end; and
a first indicator extending between the first upright assembly and the second upright assembly, the first indicator configured to establish a boundary of the performance region that extends from the first upright assembly to the second upright assembly and configured to provide an immediate feedback signal to the user based on the user intersecting the first indicator;
wherein the first indicator includes a laser source connected to the first upright assembly and a detector connected to the second upright assembly, wherein the immediate feedback signal is generated based on the user intersecting a laser beam propagating from the laser source to the detector.

11. The system of claim 1, wherein the performance region is configured to surround an area in which a gymnastics routine is performed.

12. The system of claim 11, wherein the area in which the gymnastics routine is performed surrounds a balance beam or a section of a floor mat.

13. A method of providing feedback to a user performing a physical activity, the method comprising:
positioning a first support assembly having a first upright assembly at a first end of a performance region in which a user performs the physical activity;
positioning a second support assembly having a second upright assembly at a second end of the performance region, the second end being opposite the first end;
extending a first indicator between the first upright assembly and the second upright assembly establishing a boundary of the performance region that extends from the first upright assembly to the second upright assembly; and
wherein when the user contacts the first indicator, the first indicator releases from at least one of the first support assembly and the second support assembly providing an immediate feedback signal to the user.

14. The method of claim 13, wherein the first indicator establishes a first boundary along a first side of the performance region, the method further comprising:
extending a second indicator between the first support assembly and the second support, the second indicator establishing a second boundary along a second side of the performance region opposite the first side; and
based on the user contacting one of the first indicator or the second indicator, the contacted one of the first indicator and the second indicator releases from at least one of the first support assembly and the second support assembly providing the immediate feedback signal to the user.

15. The method of claim 13, wherein the first indicator is releasably connected to the first support assembly and the second support assembly.

16. The method of claim 13, wherein the feedback signal is one of a haptic signal, a visual notification and an audible notification.

17. The method of claim 13, wherein the first support assembly and the second support assembly each include a cross member defining a width of the performance region at the first end and at the second end, wherein the cross member includes an adjustment mechanism configured to change the width of the performance region, and the method further includes selectively engaging the adjustment mechanism of at least one of the cross members to adjust the width of the performance region.

18. The method of claim 13, wherein the first indicator includes a laser source connected to the first upright assembly and a detector connected to the second upright assembly, wherein the immediate feedback signal is generated based on the user intersecting a laser beam propagating from the laser source to the detector.

19. The method of claim 13, wherein the performance region is configured to surround an area in which a gymnastics routine is performed.

20. The method of claim 13, wherein the first indicator includes at least a first section and a second section, the first section releasably connected to the second section, and wherein when the user contacts the first indicator, the first section separates from the second section.

* * * * *